(12) United States Patent
Kalyanasundharam et al.

(10) Patent No.: US 10,922,237 B2
(45) Date of Patent: Feb. 16, 2021

(54) ACCELERATING ACCESSES TO PRIVATE REGIONS IN A REGION-BASED CACHE DIRECTORY SCHEME

(71) Applicant: Advanced Micro Devices, Inc., Santa Clara, CA (US)

(72) Inventors: Vydhyanathan Kalyanasundharam, San Jose, CA (US); Amit P. Apte, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/129,022

(22) Filed: Sep. 12, 2018

(65) Prior Publication Data
US 2020/0081844 A1    Mar. 12, 2020

(51) Int. Cl.
*G06F 12/0895*    (2016.01)
*G06F 12/02*    (2006.01)
*G06F 12/0817*    (2016.01)
*G06F 12/084*    (2016.01)
(Continued)

(52) U.S. Cl.
CPC ...... *G06F 12/0895* (2013.01); *G06F 12/0215* (2013.01); *G06F 12/084* (2013.01); *G06F 12/0817* (2013.01); *G06F 12/0891* (2013.01); *G06F 12/1441* (2013.01); *G06F 2212/621* (2013.01)

(58) Field of Classification Search
CPC ............ G06F 12/0895; G06F 12/0215; G06F 12/084; G06F 12/0891; G06F 12/0817; G06F 12/1441; G06F 2212/621
See application file for complete search history.

(56) References Cited

U.S. PATENT DOCUMENTS

| | | |
|---|---|---|
| 5,463,753 A | 10/1995 | Fry et al. |
| 6,101,581 A | 8/2000 | Doren et al. |
| 6,295,598 B1 | 9/2001 | Bertoni et al. |

(Continued)

OTHER PUBLICATIONS

International Search Report and Written Opinion in International Application No. PCT/US2019/050218, dated Dec. 18, 2019, 10 pages.

(Continued)

*Primary Examiner* — Francisco A Grullon
(74) *Attorney, Agent, or Firm* — Kowert Hood Munyon Rankin and Goetzel PC; Rory D. Rankin

(57) ABSTRACT

Systems, apparatuses, and methods for accelerating accesses to private regions in a region-based cache directory scheme are disclosed. A system includes multiple processing nodes, one or more memory devices, and one or more region-based cache directories to manage cache coherence among the nodes' cache subsystems. Region-based cache directories track coherence on a region basis rather than on a cache line basis, wherein a region includes multiple cache lines. The cache directory entries for regions that are only accessed by a single node are cached locally at the node. Updates to the reference count for these entries are made locally rather than sending updates to the cache directory. When a second node accesses a first node's private region, the region is now considered shared, and the entry for this region is transferred from the first node back to the cache directory.

21 Claims, 8 Drawing Sheets

(51) Int. Cl.
*G06F 12/0891* (2016.01)
*G06F 12/14* (2006.01)

(56) References Cited

U.S. PATENT DOCUMENTS

| | | | |
|---|---|---|---|
| 6,754,782 B2 | 6/2004 | Arimilli et al. | |
| 6,810,467 B1 | 10/2004 | Khare et al. | |
| 6,826,651 B2 | 11/2004 | Michael et al. | |
| 6,868,481 B1 | 3/2005 | Gaither et al. | |
| 6,868,485 B1 | 3/2005 | Conway | |
| 6,922,755 B1 | 7/2005 | Safranek et al. | |
| 6,973,543 B1 | 12/2005 | Hughes | |
| 7,206,934 B2 | 4/2007 | Pabla et al. | |
| 7,523,327 B2 | 4/2009 | Cline | |
| 7,797,495 B1 | 9/2010 | Lepak | |
| 9,996,478 B1* | 6/2018 | Fowler | G06F 12/128 |
| 2002/0038407 A1* | 3/2002 | Mounes-Toussi | G06F 12/0815 711/141 |
| 2002/0083274 A1 | 6/2002 | Gharachorloo et al. | |
| 2003/0093621 A1 | 5/2003 | DeSota et al. | |
| 2003/0154345 A1 | 8/2003 | Lyon | |
| 2003/0217234 A1 | 11/2003 | Rowlands | |
| 2004/0088496 A1 | 5/2004 | Glasco et al. | |
| 2004/0268061 A1 | 12/2004 | Khare et al. | |
| 2005/0154831 A1 | 7/2005 | Steely, Jr. et al. | |
| 2005/0160240 A1 | 7/2005 | Van Doren et al. | |
| 2005/0251626 A1 | 11/2005 | Glasco | |
| 2007/0055826 A1 | 3/2007 | Morton et al. | |
| 2007/0156972 A1 | 7/2007 | Uehara et al. | |
| 2008/0086601 A1 | 4/2008 | Gaither et al. | |
| 2008/0244134 A1 | 10/2008 | Hosomi et al. | |
| 2009/0249318 A1 | 10/2009 | Ayguade et al. | |
| 2010/0005245 A1 | 1/2010 | Beers et al. | |
| 2012/0210068 A1 | 8/2012 | Joshi et al. | |
| 2013/0097385 A1* | 4/2013 | Beckmann | G06F 12/0817 711/128 |
| 2013/0290643 A1* | 10/2013 | Lim | G06F 16/24552 711/144 |
| 2014/0032848 A1 | 1/2014 | Zhao et al. | |
| 2014/0379997 A1 | 12/2014 | Blaner et al. | |
| 2015/0058570 A1 | 2/2015 | Wang et al. | |
| 2015/0242318 A1 | 8/2015 | Bernard et al. | |
| 2016/0357671 A1 | 12/2016 | Kuskin | |
| 2017/0177484 A1 | 6/2017 | Conway | |
| 2019/0188137 A1 | 6/2019 | Kalyanasundharam et al. | |

OTHER PUBLICATIONS

International Search Report and Written Opinion in International Application No. PCT/US2018/051765, dated Nov. 26, 2018, 12 pages.

Martin et al., "Using Destination-Set Prediction to Improve the Latency/Bandwidth Tradeoff in Shared-Memory Multiprocessors", Proceedings of the 30th Annual Symposium on Computer Architecture, Jun. 9, 2003, pp. 206-217.

Kalyanasundharam et al., U.S. Appl. No. 16/119,438, entitled "Region Based Split-Directory Scheme to Adapt to Large Cache Sizes", filed Aug. 31, 2018, 36 pages.

* cited by examiner

US 10,922,237 B2

ACCELERATING ACCESSES TO PRIVATE REGIONS IN A REGION-BASED CACHE DIRECTORY SCHEME

BACKGROUND

Description of the Related Art

Computer systems use main memory that is typically formed with inexpensive and high density dynamic random access memory (DRAM) chips. However DRAM chips suffer from relatively long access times. To improve performance, data processors typically include at least one local, high-speed memory known as a cache. In a multi-core data processor, each data processor core can have its own dedicated level one (L1) cache, while other caches (e.g., level two (L2), level three (L3)) are shared by data processor cores.

Cache subsystems in a computing system include high-speed cache memories which store blocks of data. As used herein, a "block" is a set of bytes stored in contiguous memory locations, which are treated as a unit for coherency purposes. As used herein, each of the terms "cache block", "block", "cache line", and "line" is interchangeable. In some implementations, a block can also be the unit of allocation and deallocation in a cache. The number of bytes in a block is varied according to design choice.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Cache directories are a key building block in high performance scalable systems. A cache directory is used to keep track of the cache lines that are currently in use by the system. A cache directory improves both memory bandwidth as well as reducing probe bandwidth by performing a memory request or probe request only when required. Logically, the cache directory resides at the home node of a cache line which enforces the cache coherence protocol. The operating principle of a cache directory is inclusivity (i.e., a line that is present in a central processing unit (CPU) cache must be present in the cache directory). In a cache line based directory scheme, each cache line is tracked individually. So, the size of the cache directory has to increase linearly with the total capacity of all of the CPU cache subsystems in the computing system. The total CPU cache size tends to grow exponentially as memory technology improves. Accordingly, a line-based cache directory scheme is not able to keep up with the exponential growth of the CPU cache size.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for accelerating accesses to private regions in a region-based cache directory scheme are disclosed. A system includes multiple processing nodes, with each processing node including a cache subsystem. A system also includes one or more memory devices and one or more region-based cache directories to help manage cache coherency among the nodes' cache subsystems. In order to reduce the number of entries in the cache directories, the cache directories track coherency on a region basis rather than on a cache line basis, wherein a region includes multiple cache lines. The cache directory entries for private regions that are only accessed by a single node are cached locally at the node. Updates to the reference count for these entries are made locally rather than sending updates to the cache directory. When a second node accesses a first node's private region, the region is now considered shared, and the entry for this region is transferred from the first node back to the cache directory.

Figure 1:
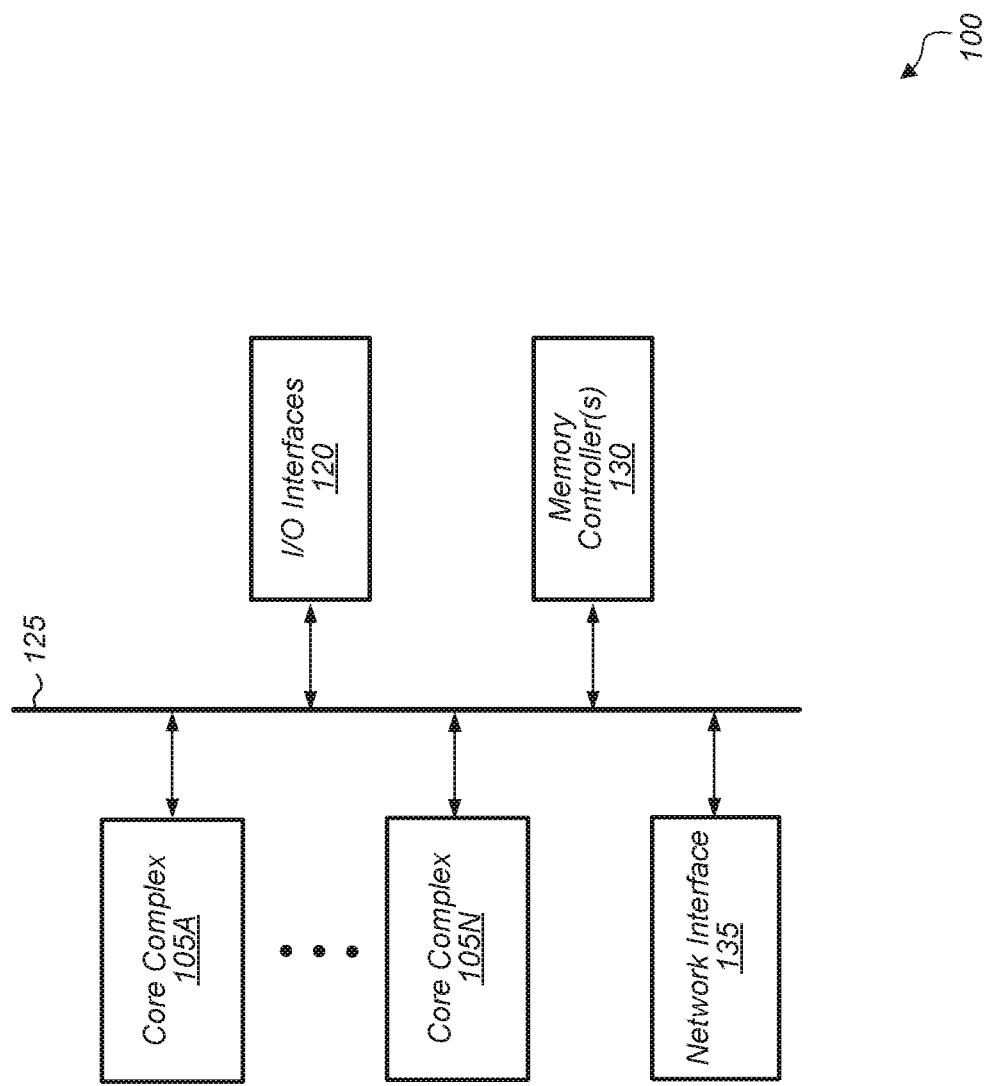
FIG. 1 is a block diagram of one implementation of a computing system.

Referring now to FIG. 1, a block diagram of one implementation of a computing system 100 is shown. In one implementation, computing system 100 includes at least core complexes 105A-N, input/output (I/O) interfaces 120, bus 125, memory controller(s) 130, and network interface 135. In other implementations, computing system 100 includes other components and/or computing system 100 is arranged differently. In one implementation, each core complex 105A-N includes one or more general purpose processors, such as central processing units (CPUs). It is noted that a "core complex" can also be referred to as a "processing node" or a "CPU" herein. In some implementations, one or more core complexes 105A-N include a data parallel processor with a highly parallel architecture. Examples of data parallel processors include graphics processing units (GPUs), digital signal processors (DSPs), field programmable gate arrays (FPGAs), application specific integrated circuits (ASICs), and so forth. Each processor core within core complex 105A-N includes a cache subsystem with one or more levels of caches. In one implementation, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 120. Such peripheral devices include (but are not limited to) displays, keyboards, mice, printers, scanners, joysticks or other types of game controllers, media recording devices, external storage devices, network interface cards, and so forth.

In various implementations, computing system 100 is a server, computer, laptop, mobile device, game console, streaming device, wearable device, or any of various other types of computing systems or devices. It is noted that the number of components of computing system 100 varies from implementation to implementation. In other implementations, there are more or fewer of each component than the number shown in FIG. 1. It is also noted that in other implementations, computing system 100 includes other components not shown in FIG. 1 and/or is structured in other ways.

Figure 2:
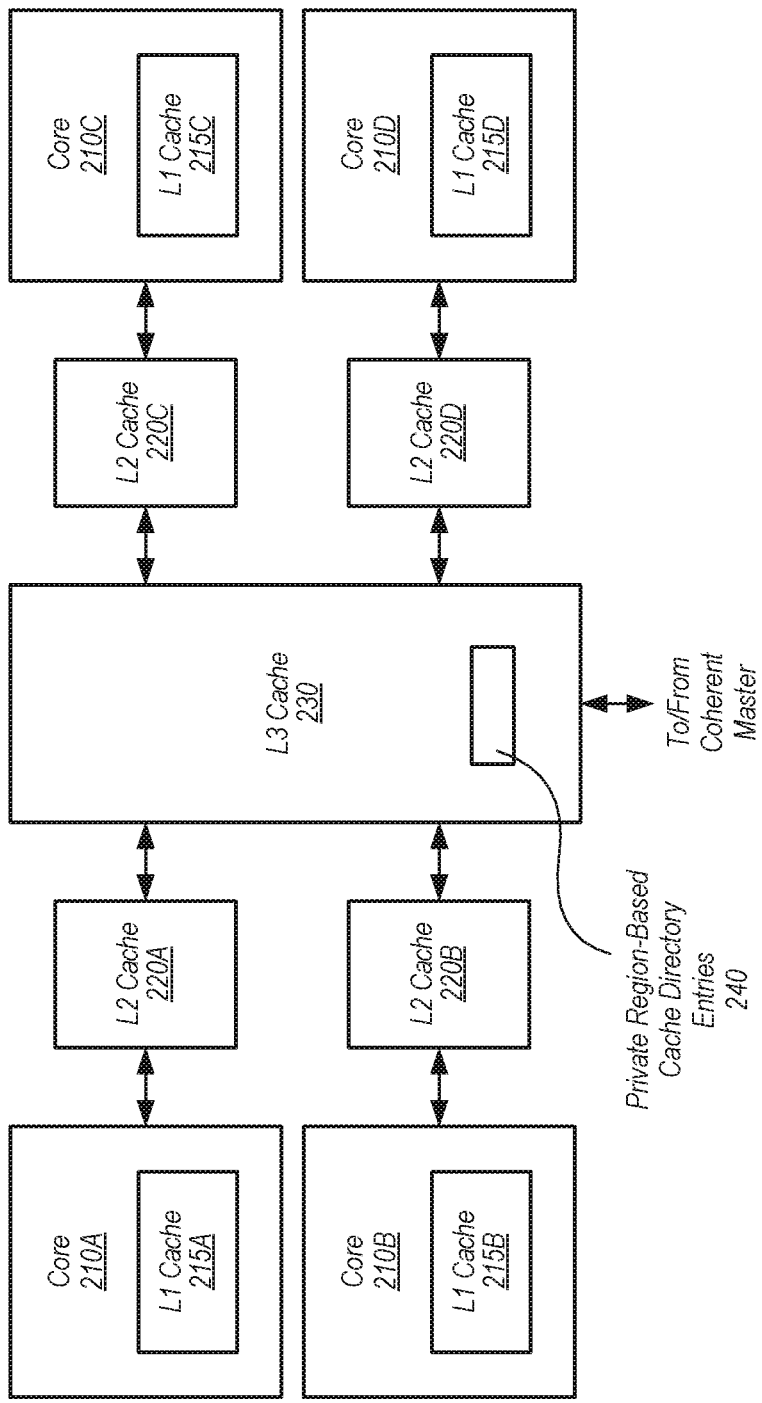
FIG. 2 is a block diagram of one implementation of a core complex.

Turning now to FIG. 2, a block diagram of one implementation of a core complex 200 is shown. In one implementation, core complex 200 includes four processor cores 210A-D. In other implementations, core complex 200 includes other numbers of processor cores. It is noted that a "core complex" can also be referred to as a "processing node" or "CPU" herein. In one implementation, the components of core complex 200 are included within core complexes 105A-N (of FIG. 1).

Each processor core 210A-D includes a cache subsystem for storing data and instructions retrieved from the memory subsystem (not shown). For example, in one implementation, each core 210A-D includes a corresponding level one (L1) cache 215A-D. In one implementation, each processor core 210A-D includes or is coupled to a corresponding level two (L2) cache 220A-D. Additionally, in one implementation, core complex 200 includes a level three (L3) cache 230 which is shared by the processor cores 210A-D. In this implementation, L3 cache 230 is coupled to a coherent master for access to the fabric and memory subsystem. It is noted that in other implementations, core complex 200 includes other types of cache subsystems with other numbers of caches and/or with other configurations of the different cache levels.

In one implementation, private region-based cache directory entries 240 are stored within L3 cache 230. In another implementation, private region-based cache directory entries 240 are stored in a coherent master (not shown) coupled to core complex 200. In other implementations, private region-based cache directory entries 240 are stored in other locations within core complex 200 or external to core complex 200.

Each entry in private region-based cache directory entries 240 tracks a private region that has at least one cache line accessed by any of the cores 210A-D of core complex 200. As used herein, the term "private region" is defined as a region which has cache lines cached in only a single processing node of the overall computing system. When a cache line of a given region is allocated in L1 caches 215A-D, a lookup is performed of CPU cache directory 240 for the given region. If an entry is already allocated in private region-based cache directory entries 240 for the given region, then a reference count of the matching entry is incremented. If the lookup of private region-based cache directory entries 240 is a miss for the given region, then an indication of the miss is sent to the corresponding region-based cache directory (not shown). If the corresponding region-based cache directory responds with a message indicating the given region is a private region (i.e., no other processing nodes have cache lines cached for the given region), then a new entry is allocated for the given region in private region-based cache directory entries 240.

If a given cache line in L1 caches 215A-D or L2 caches 220A-D is evicted or invalidated by a coherency probe, and if private region-based cache directory entries 240 has an entry for the region of this given cache line, then the reference count for this entry is decremented. If the reference count for the entry goes to zero, then this entry is marked as invalid and can be reclaimed. Also, when the reference count for a private region-based cache directory entry 240 goes to zero, a notification is sent to the region-based cache directory. In response to receiving this message, a corresponding entry in the region-based cache directory is invalidated.

Figure 3:
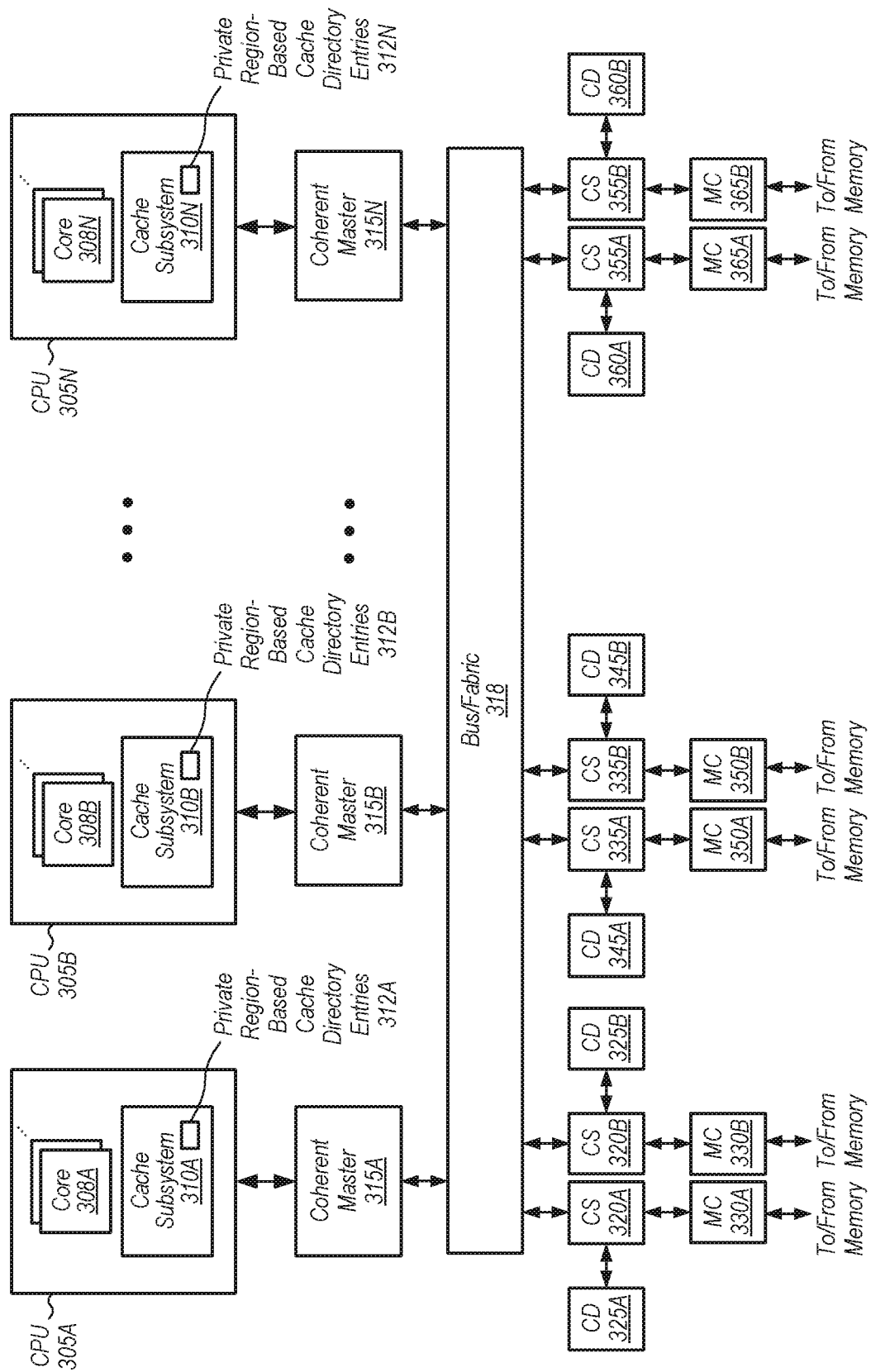
FIG. 3 is a block diagram of one implementation of a multi-CPU system.

Referring now to FIG. 3, a block diagram of one implementation of a multi-CPU system 300 is shown. In one implementation, system includes multiple CPUs 305A-N. The number of CPUs per system varies from implementation to implementation. Each CPU 305A-N includes any number of cores 308A-N, respectively, with the number of cores varying according to the implementation. Each CPU 305A-N also includes a corresponding cache subsystem 310A-N. Each cache subsystem 310A-N includes any number of levels of caches and any type of cache hierarchy structure.

In one implementation, each cache subsystem 310A-N includes private region-based cache directory entries 312A-N, respectively. For example, cache subsystem 310A includes any number of private region-based cache directory entries 312A, with each private region-based cache directory entry storing information for a corresponding region which has only been accessed by CPU 305A. For example, when CPU 305A caches a cache line in cache subsystem 312A for a given region and the given region is private, then a cache directory entry is maintained by cache subsystem 312A for the given region. The cache directory entry tracks the number of cache lines which have been accessed by CPU 305A within the given region. If at some later point in time the given region becomes shared (i.e., another CPU 305B-N accesses the given region), then the reference count from the entry 312A is sent to the corresponding cache directory and then the entry 312A is discarded. The other cache subsystems 310B-N include private region-based cache directory entries 312B-N storing information for their respective private regions. In one implementation, CPU 305A performs a write-through to the corresponding cache directory when CPU 305A updates the local cached copy of a private region cache directory entry 312A. This enables CPU 305A to discard a local cache directory entry 312A when it is time to replace the local cache directory entry 312A since the corresponding cache directory is already in sync. For example, in one implementation, a replacement of a local cache directory entry 312A occurs in response to a capacity eviction from the local storage area.

In one implementation, each CPU 305A-N is connected to a corresponding coherent master 315A-N. In another implementation, the CPU-based cache directories 312A-N are stored in coherent masters 315A-N, respectively, rather than being stored in the cache hierarchy of respective CPUs 305A-N. As used herein, a "coherent master" is defined as an agent that processes traffic flowing over an interconnect (e.g., bus/fabric 318) and manages coherency for a connected CPU. To manage coherency, a coherent master receives and processes coherency-related messages and probes, and the coherent master generates coherency-related requests and probes. It is noted that a "coherent master" can also be referred to as a "coherent master unit" herein.

In one implementation, each CPU 305A-N is coupled to a pair of coherent slaves via a corresponding coherent master 315A-N and bus/fabric 318. For example, CPU 305A is coupled through coherent master 315A and bus/fabric 318 to coherent slaves 320A-B. In other implementations, bus/fabric 318 includes connections to other components which are not shown to avoid obscuring the figure. For example, in another implementation, bus/fabric 318 includes connections to one or more I/O interfaces and one or more I/O devices.

Coherent slave (CS) 320A is coupled to memory controller (MC) 330A and coherent slave 320B is coupled to memory controller 330B. Coherent slave 320A is coupled to region-based cache directory (CD) 325A, with region-based cache directory 325A including entries for memory regions that have cache lines cached in system 300 for the memory accessible through memory controller 330A. It is noted that region-based cache directory 325A, and each of the other region-based cache directories 325B, 345A-B, and 360A-B, can also be referred to as a "probe filter". Coherent slave 320B is coupled to region-based cache directory 325B, with region-based cache directory 325B including entries for memory regions that have cache lines cached in system 300 for the memory accessible through memory controller 330B. It is noted that the example of having two memory controllers per CPU is merely indicative of one implementation. It should be understood that in other implementations, each CPU 305A-N can be connected to other numbers of memory controllers besides two.

In a similar configuration to that of CPU 305A, CPU 305B is coupled to coherent slaves 335A-B via coherent master 315B and bus/fabric 318. Coherent slave 335A is coupled to memory via memory controller 350A, and coherent slave 335A is also coupled to region-based cache directory 345A to manage the coherency of cache lines corresponding to memory accessible through memory controller 350A. Coherent slave 335B is coupled to region-based cache directory 345B and coherent slave 335B is coupled to memory via memory controller 365B. Also, CPU 305N is coupled to coherent slaves 355A-B via coherent master 315N and bus/fabric 318. Coherent slaves 355A-B are coupled to region-based cache directory 360A-B, respectively, and coherent slaves 355A-B are coupled to memory via memory controllers 365A-B, respectively. As used herein, a "coherent slave" is defined as an agent that manages coherency by processing received requests and probes that target a corresponding memory controller. It is noted that a "coherent slave" can also be referred to as a "coherent slave unit" herein. Additionally, as used herein, a "probe" is defined as a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs a lookup to its corresponding region-based cache directory to determine if the request targets a region which has at least one cache line cached in any of the cache subsystems. In one implementation, each region-based cache directory 325A-B, 345A-B, and 360A-B in system 300 tracks regions of memory, wherein a region includes a plurality of cache lines. The size of the region being tracked can vary from implementation to implementation. By tracking at a granularity of a region rather than at a finer granularity of a cache line, the size of each region-based cache directory 325A-B, 345A-B, and 360A-B is reduced. It is noted that a "region" can also be referred to as a "page" herein. When a request is received by a coherent slave, the coherent slave determines the region which is targeted by the request. Then a lookup is performed of the region-based cache directory for this region. If the lookup results in a hit, then the coherent slave sends a probe to the CPU(s) which are identified in the hit entry. The type of probe that is generated by the coherent slave depends on the coherency state specified by the hit entry.

Figure 4:
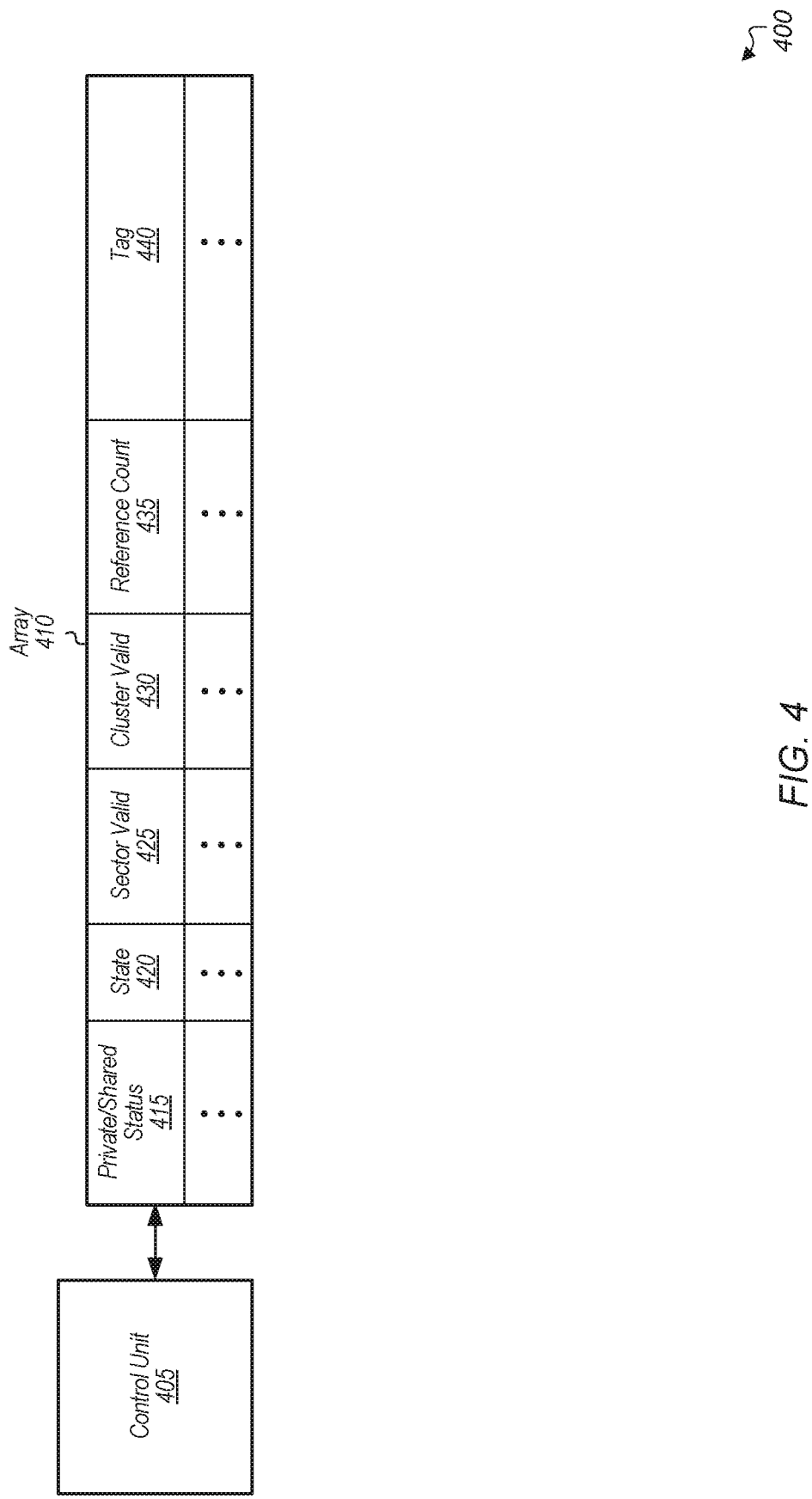
FIG. 4 is a block diagram of one implementation of a region-based cache directory.

Turning now to FIG. 4, a block diagram of one implementation of a region-based cache directory 400 is shown. In one implementation, region-based cache directories 325A-B, 345A-B, and 360A-B (of FIG. 3) include the functionality shown in region-based cache directory 400. In one implementation, region-based cache directory 400 includes control unit 405 and array 410. Array 410 includes any number of entries, with the number of entries varying according to the implementation. In one implementation, each entry of array 410 includes a private/shared status field 415, state field 420, sector valid field 425, cluster valid field 430, reference count field 435, and tag field 440. In other implementations, the entries of array 410 include other fields, omit one or more of the illustrated fields, and/or are arranged in other suitable manners.

The private/shared status field 415 indicates whether the corresponding region is private or shared. A private region is accessed by only a single processing node or a single device. In other words, cache lines from a private region are cached by only a single processing node or a single device. A shared region is accessed by two or more processing nodes or devices. In other words, cache lines from a shared region are cached by two or more processing nodes or devices. If a region is private, then the reference count field 435 for the region is maintained locally by the processing node or device which is accessing the region. If a region is shared, then the cache directory maintains the reference count field 435 for the region. When a region transitions between the private and shared states, the reference count field 435 is transferred between the node or device and the cache directory.

The state field 420 includes state bits that specify the aggregate state of the region. In one implementation, the aggregate state is a reflection of the most restrictive cache line state for this particular region. For example, the state for a given region is stored as "dirty" even if only a single cache line for the entire given region is dirty. Also, the state for a given region is stored as "shared" even if only a single cache line of the entire given region is shared.

The sector valid field 425 stores a bit vector corresponding to sub-groups or sectors of lines within the region to provide fine grained tracking. The organization of sub-groups and the number of bits in sector valid field 425 vary according to the implementation. In one implementation, two lines are tracked within a particular region entry using sector valid field 425. In another implementation, other numbers of lines are tracked within each region entry. In this implementation, sector valid field 425 is used to indicate the number of partitions that are being individually tracked within the region. Additionally, the partitions are identified using offsets which are stored in sector valid field 425. Each offset identifies the location of the given partition within the given region. Sector valid field 425, or another field of the entry, also indicates separate owners and separate states for each partition within the given region. The cluster valid field 430 includes a bit vector to track the presence of the region across various CPU cache clusters. For example, in one embodiment, CPUs are grouped together into clusters of CPUs. The bit vector stored in cluster valid field 430 is used to reduce probe destinations for regular coherency probes and region invalidation probes.

The reference count field 435 is used to track the number of cache lines of the region which are cached somewhere in the system. On the first access to a region, an entry is installed in table 410 and the processing node or device which made the first access to the region will maintain the reference count field 435 for the region in a locally maintained entry. The reference count field 435 is set to one on the first access to the region. Each time the same processing node or device accesses a cache line from this region, the reference count is incremented. As long as the region stays private, these accesses only require updating the reference count in the locally maintained entry, and a notification to the cache directory does not need to be sent. This helps to reduce the amount of probe traffic sent on the fabric. As cache lines from this region get evicted by the caches of the same processing node or device or invalidated by a coherency probe, the reference count decrements. Eventually, if the reference count reaches zero, the same processing node or device notifies the cache directory and then the entry is marked as invalid, allowing the entry to be reused for another region. If another processing node or device accesses a cache line from the region, causing the region to transition from private to shared, then the cache directory will start to manage the reference count field 435 for the region. The tag field 440 includes the tag bits that are used to identify the entry associated with a particular region.

Figure 5:
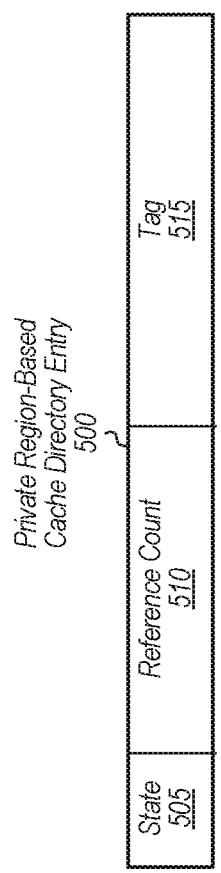
FIG. 5 illustrates one implementation of a private region-based cache directory entry.

Referring now to FIG. 5, one implementation of a private region-based cache directory entry 500 is shown. In one implementation, each entry of private region-based cache directory entries 312A-N (of FIG. 3) is structured as shown in private region-based cache directory entry 500. In one implementation, private region-based cache directory entry 500 includes at least a state field 505, reference count field 510, and tag field 515. The state field 505 includes state bits that specify the status (e.g., coherency states such as dirty, shared, valid, invalid, etc.) of the region. In one implementation, the status is specified to represent the most restrictive cache line state for this particular region. The reference count field 510 tracks the number of different cache lines of the region that are cached by the node or device. Tag field 515 includes the tag bits that are used to identify the entry associated with a particular region. In other implementations, private region-based cache directory entry 500 includes other fields and/or is arranged in other suitable manners.

In one implementation, a device locally stores one or more private region-based cache directory entries 500 to accelerate accesses to regions with a coherency state of "invalid" which are known to miss in the cache directory. For example, an I/O device or direct memory access (DMA) device which creates content in memory stores a plurality of private region-based cache directory entries 500 for the regions of memory where the newly created content is being stored. A first write to a given region by a device creates a corresponding private region-based cache directory entry 500 with a state set to "invalid", while subsequent writes to the given region by the device will hit on this entry 500. On a write to a region with a private region coherency state of invalid, only local storage is needed and a write-through update to the cache directory is not required. Additionally, in such a case, no reference count update is needed. Rather, the local storage is simply being used to accelerate writes which are known will miss in the cache directory. In this manner, latencies due to a directory lookup are reduced and throughput is increased.

Figure 6:
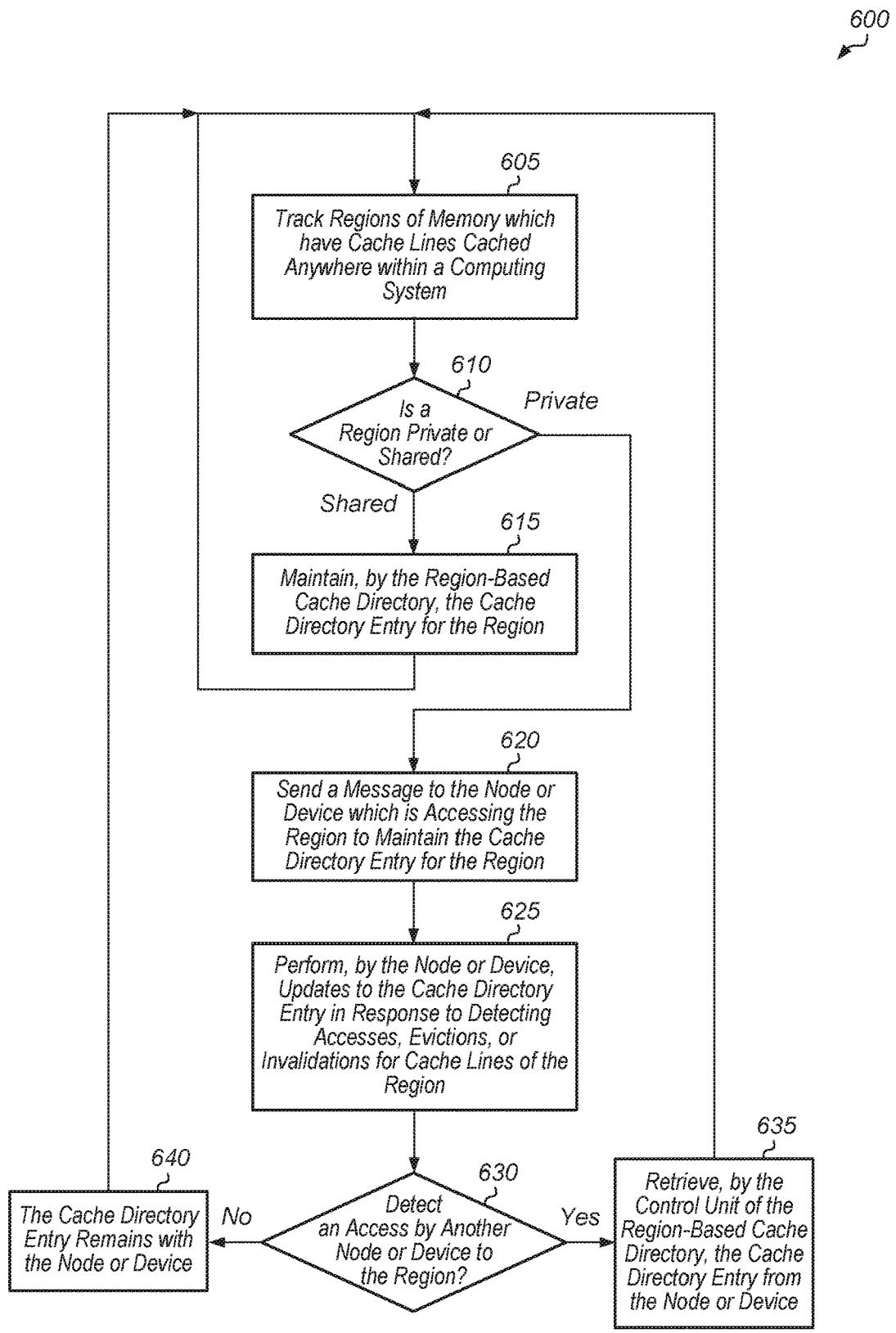
FIG. 6 is a generalized flow diagram illustrating one implementation of a method for accelerating accesses to private regions for a region-based cache directory scheme.
Figure 7:
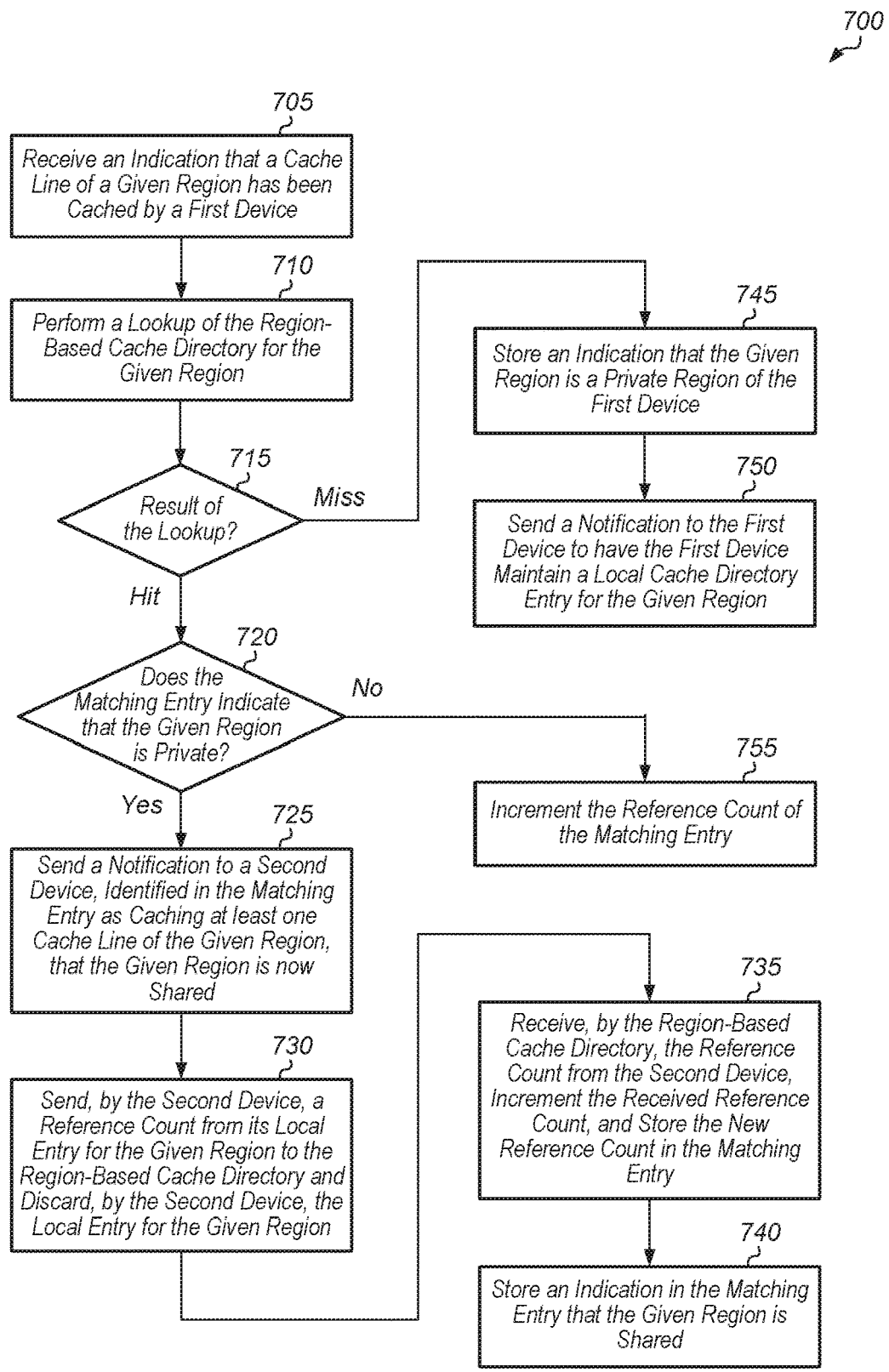
FIG. 7 is a generalized flow diagram illustrating one implementation of a method for maintaining a region-based cache directory.
Figure 8:
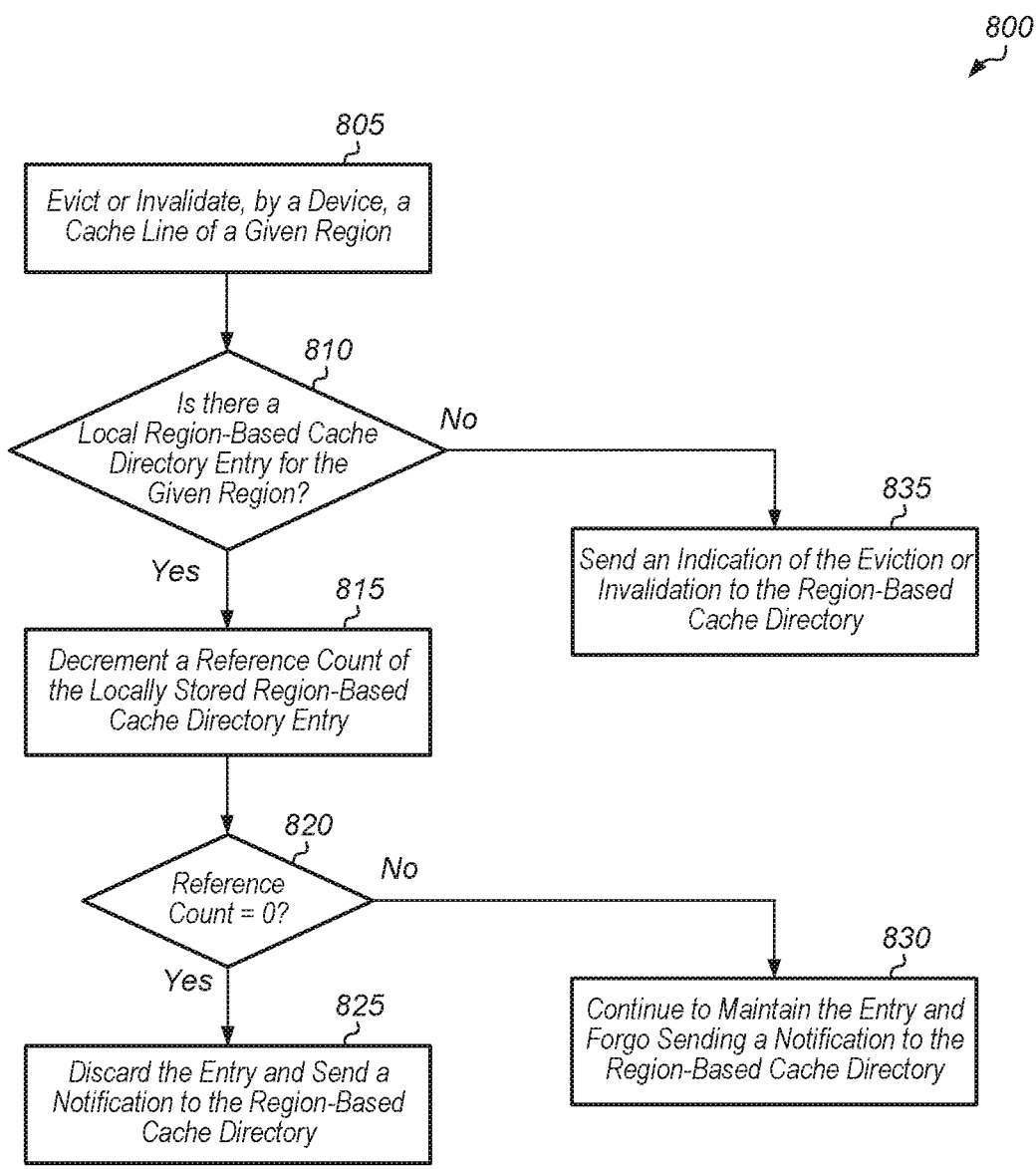
FIG. 8 is a generalized flow diagram illustrating one implementation of a method for managing region-based cache directory entries.

Turning now to FIG. 6, one implementation of a method 600 for accelerating accesses to private regions for a region-based cache directory scheme is shown. For purposes of discussion, the steps in this implementation and those of FIG. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A control unit tracks regions of memory which have cache lines cached anywhere within a computing system (block 605). For each region that has been accessed, the control unit tracks whether the region is private (i.e., only a single node or device has accessed the region) or shared (i.e., two or more nodes or devices have accessed the region) (conditional block 610). If the region is shared (conditional block 610, "no" leg), then the region-based cache directory maintains the cache directory entry for the region (block 615). After block 615, method 600 returns to block 605. If the region is private (conditional block 610, "private" leg), then the control unit sends a message to the node or device which is accessing the region to maintain the cache directory entry for the region (block 620). Updates to the cache directory entry are performed by the node or device in response to detecting accesses, evictions, or invalidations for cache lines of the region (block 625). If another device or node subsequently accesses the region (conditional block 630, "yes" leg), then the control unit of the region-based cache directory retrieves the cache directory entry from the node or device (block 635). Otherwise, if no accesses by other devices or nodes to the region are detected (conditional block 630, "no" leg), then the cache directory entry remains with the node or device (block 640). After blocks 635 and 640, method 600 returns to block 605. It is noted that in one implementation, method 600 is performed for each region of the memory space that has been accessed.

Referring now to FIG. 7, one implementation of a method 700 for maintaining a region-based cache directory is shown. A region-based cache directory receives an indication that a cache line of a given region has been cached by a first device (block 705). It is assumed for the purposes of this discussion that this is the first cache line of the given region being cached by the first device. In other words, prior to the cache line of the given region being cached by the first device, the first device did not have any other cache lines of the given region in its cache subsystem. Depending on the implementation, the first device can be a node, an I/O device, or another type of device. In response to receiving the indication, a lookup is performed by the region-based cache directory for the given region (block 710). If the lookup is a hit (conditional block 715, "hit" leg), then if the matching entry stores an indication that the given region is private (conditional block 720, "yes" leg), then the region-based cache directory sends a notification to a second device, identified in the matching entry as caching at least one cache line of the given region, that the given region is now shared (block 725). If the lookup is a hit, this means that the given region is now shared among at least two different devices. In this case, the region-based cache directory will maintain the cache directory entry for the given region and devices will send updates to the region-based cache directory for additional cache lines of the given region being cached or for evicted or invalidated cache lines for the given region.

In response to receiving the notification, the second device sends a reference count from its local entry for the given region to the region-based cache directory and then the second device discards the local entry for the given region (block 730). Alternatively, in another implementation, the second device invalidates the private entry for the given region rather than discarding the private entry. The region-based cache directory receives the reference count from the second device and then the region-based cache directory increments the reference count and stores the new reference count in an entry in the region-based cache directory (block 735). The region-based cache directory also stores an indication in the matching entry that the given region is shared (block 740).

If the lookup is a miss (conditional block 715, "no" leg), then the region-based cache directory stores an indication that the given region is a private region of the first device (block 745). Also, the region-based cache directory sends a notification to the first device to have the first device maintain a local cache directory entry for the given region (block 750). If at a later point in time another device accesses the given region, then the region-based cache directory will retrieve the reference count from the first device and start to maintain the entry for the given region. After blocks 740 and 750, method 700 ends. If the matching entry stores an indication that the given region is shared (conditional block 720, "no" leg), then the region-based cache directory increments the reference count of the matching entry (block 755). After block 755, method 700 ends.

Turning now to FIG. 8, one implementation of a method 800 for managing region-based directory entries is shown. A device evicts or invalidates a cache line of a given region of memory (block 805). In various implementations, the device can be a processing node, an I/O device, or other type of device. In response to evicting or invalidating the cache line of the given region, the device determines whether there is a local region-based cache directory entry for the given region (conditional block 810). In other words, the device is determining whether the given region is private (i.e., the region-based cache directory entry is stored locally at the device) or shared (i.e., the region-based cache directory entry is maintained by the region-based cache directory) in conditional block 810.

If a region-based cache directory entry for the given region is stored locally at the device (conditional block 810, "yes" leg), then the device decrements a reference count of the locally stored region-based cache directory entry (block 815). If the reference count is equal to zero after being decremented (conditional block 820, "yes" leg), then the device discards the entry and sends a notification to the region-based cache directory (block 825). Otherwise, if the reference count of the entry is greater than zero (conditional block 820, "no" leg), then the device continues to maintain the entry and the device forgoes sending a notification to the region-based cache directory (block 830). After block 830, method 800 ends. If the device does not have a locally stored region-based directory entry for the given region (conditional block 810, "no" leg), then the device sends an indication of the eviction or invalidation to the region-based cache directory (block 835). After block 835, method 800 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a plurality of processing nodes, wherein each processing node of the plurality of processing nodes comprises one or more processors and a cache subsystem;
   one or more memory devices; and
   one or more region-based cache directories, wherein each region-based cache directory is configured to track shared regions of memory which have cache lines cached by at least two different processing nodes; and
   wherein each processing node of the plurality of processing nodes is configured to maintain an entry with a reference count field to track a number of accesses by the processing node to separate cache lines of a given region responsive to receiving an indication from a corresponding region-based cache directory that the given region is private, wherein a private region is accessed by only a single processing node.

2. The system as recited in claim 1, wherein each processing node is further configured to perform updates to the reference count field of the entry without notifying the corresponding region-based cache directory while the reference count field is greater than zero.

3. The system as recited in claim 2, wherein each processing node is further configured to send the reference count field of the entry to the corresponding region-based cache directory and invalidate the entry responsive to receiving a notification from the corresponding region-based cache directory that a cache line of the region has been cached by another processing node.

4. The system as recited in claim 1, wherein each region-based cache directory of the one or more region-based cache directories is configured to maintain an entry for each shared region tracking a number of accesses by the plurality of processing nodes to separate cache lines of the shared region, wherein a shared region is accessed by at least two processing nodes.

5. The system as recited in claim 4, wherein a first region-based cache directory of the one or more region-based cache directories is configured to:
perform a lookup responsive to receiving an indication that a cache line of a given region has been cached by a first processing node; and
send a notification to the first processing node to have the first processing node maintain a local region-based cache directory entry for the given region responsive to the lookup missing.

6. The system as recited in claim 5, wherein the first region-based cache directory is further configured to:
determine if a matching entry indicates that the given region was private responsive to the lookup hitting; and
responsive to determining that the matching entry indicates that the given region was private, send a notification to a second processing node, identified in the matching entry, that the given region is now shared.

7. The system as recited in claim 6, wherein the first region-based cache directory is further configured to:
receive the reference count from the second processing node responsive to the second processing node receiving the notification and sending the reference count to the region-based cache directory; and
increment and store the reference count in the matching entry.

8. A method comprising:
tracking, by one or more region-based cache directories, shared regions of memory which have cache lines cached by at least two different processing nodes; and
maintaining, by each processing node of a plurality of processing nodes, an entry with a reference count field to track a number of accesses by the processing node to separate cache lines of a given region responsive to receiving an indication from a corresponding region-based cache directory that the given region is private, wherein a private region is accessed by only a single processing node.

9. The method as recited in claim 8, further comprising performing, by each processing node, updates to the reference count field of the entry without notifying the corresponding region-based cache directory while the reference count field is greater than zero.

10. The method as recited in claim 9, further comprising sending, by each processing node, the reference count field of the entry to the corresponding region-based cache directory and invalidating the entry responsive to receiving a notification from the corresponding region-based cache directory that a cache line of the region has been cached by another processing node.

11. The method as recited in claim 8, further comprising maintaining, by each region-based cache directory, an entry for each shared region tracking a number of accesses by the plurality of processing nodes to separate cache lines of the shared region, wherein a shared region is accessed by at least two processing nodes.

12. The method as recited in claim 11, further comprising:
performing, by a first region-based cache directory, a lookup responsive to receiving an indication that a cache line of a given region has been cached by a first processing node; and
sending, by the first region-based cache directory, a notification to the first processing node to have the first processing node maintain a local region-based cache directory entry for the given region responsive to the lookup missing.

13. The method as recited in claim 12, further comprising:
determining, by the first region-based cache directory, if a matching entry indicates that the given region was private responsive to the lookup hitting; and
responsive to determining that the given region was private, sending, by the first region-based cache directory, a notification to a second processing node, identified in the matching entry, that the given region is now shared.

14. The method as recited in claim 13, further comprising:
receiving, by the first region-based cache directory, the reference count from the second processing node responsive to the second processing node receiving the notification and sending the reference count to the first region-based cache directory; and
incrementing and storing, by the first region-based cache directory, the reference count in the matching entry.

15. An apparatus comprising:
a plurality of processing nodes, wherein each processing node comprises one or more processors and a cache subsystem; and
a plurality of node-based cache directories, wherein each region-based cache directory is configured to track shared regions of memory which have cache lines cached by at least two different processing nodes; and
wherein a first processing node is configured to maintain an entry with a reference count field to track a number of accesses by the first processing node to separate cache lines of a first region responsive to receiving an indication from a corresponding region-based cache directory that the first region is only being accessed by the first processing node.

16. The apparatus as recited in claim 15, wherein the first processing node is further configured to perform updates to the reference count field of the entry without notifying the corresponding region-based cache directory while the reference count field is greater than zero.

17. The apparatus as recited in claim 16, wherein the first processing node is further configured to send the reference count field of the entry to the corresponding region-based cache directory and invalidate the entry responsive to receiving a notification from the corresponding region-based cache directory that a cache line of the first region has been cached by another processing node.

18. The apparatus as recited in claim 15, wherein each region-based cache directory of the plurality of region-based cache directories is configured to maintain an entry for each shared region tracking a number of accesses by the plurality of processing nodes to separate cache lines of the shared region, wherein a shared region is accessed by at least two processing nodes.

19. The apparatus as recited in claim 18, wherein a first region-based cache directory of the plurality of region-based cache directories is configured to:
- perform a lookup responsive to receiving an indication that a cache line of a second region has been cached by the first processing node; and
- send a notification to the first processing node to have the first processing node maintain a local region-based cache directory entry for the second region responsive to the lookup missing.

20. The apparatus as recited in claim 19, wherein the first region-based cache directory is further configured to:
- determine if a matching entry indicates that the second region was private responsive to the lookup hitting; and
- responsive to determining that the matching entry indicates that the given region was private, send a notification to a second processing node, identified in the matching entry, that the given region is now shared.

21. The apparatus as recited in claim 19, wherein the first node-based cache directory is further configured to invalidate a second entry for the given region responsive to receiving responses to the invalidation probes that all cache lines for the given region have been evicted.

\* \* \* \* \*